Aug. 16, 1960   G. L. SHERWOOD   2,948,897
MACHINE FOR USE IN MANUFACTURING BLIND SLATS AND THE LIKE
Filed April 19, 1957   4 Sheets-Sheet 2
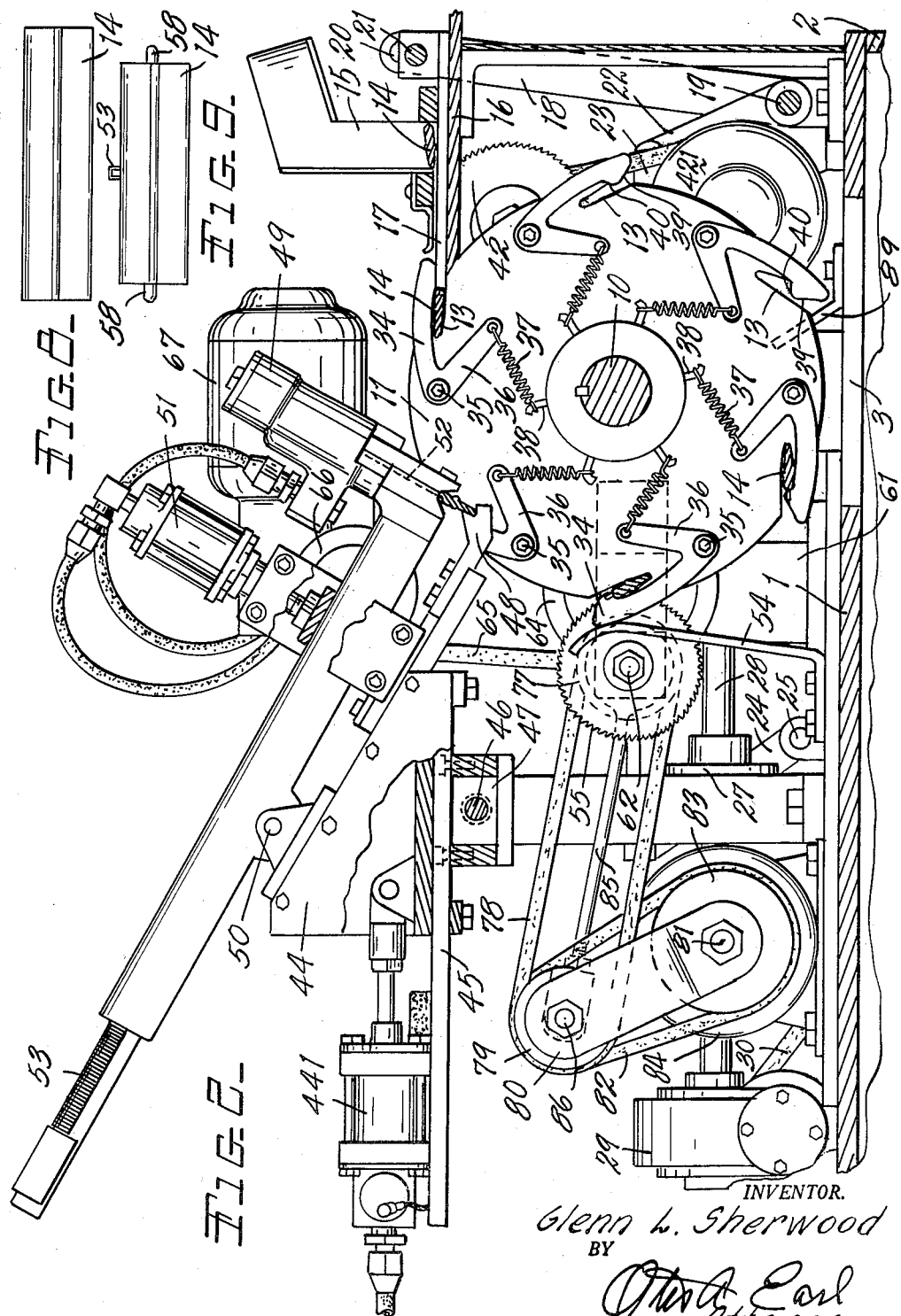
INVENTOR.
Glenn L. Sherwood
BY
Otto A. Earl
Attorney.

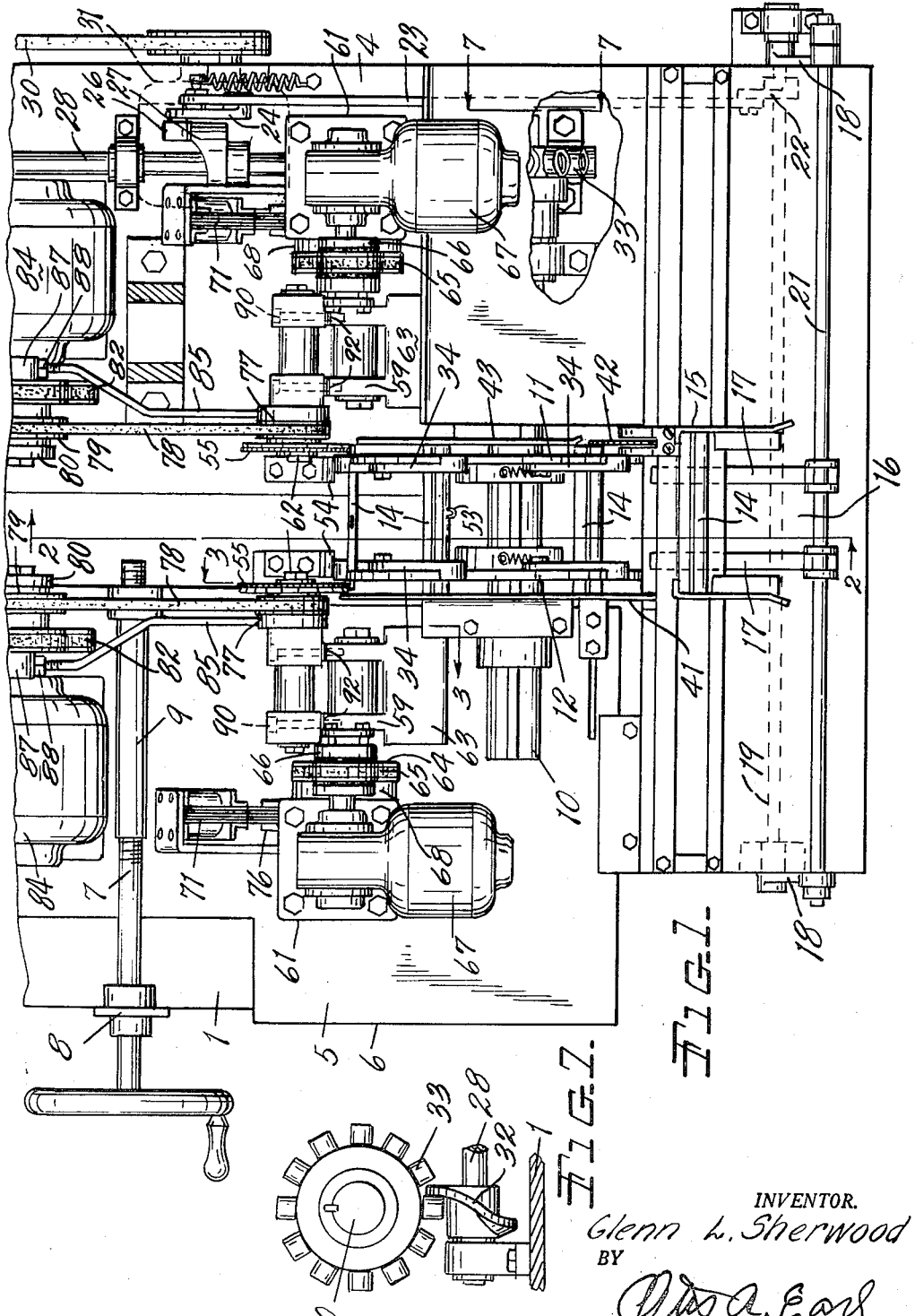

Aug. 16, 1960  G. L. SHERWOOD  2,948,897
MACHINE FOR USE IN MANUFACTURING BLIND SLATS AND THE LIKE
Filed April 19, 1957  4 Sheets-Sheet 3
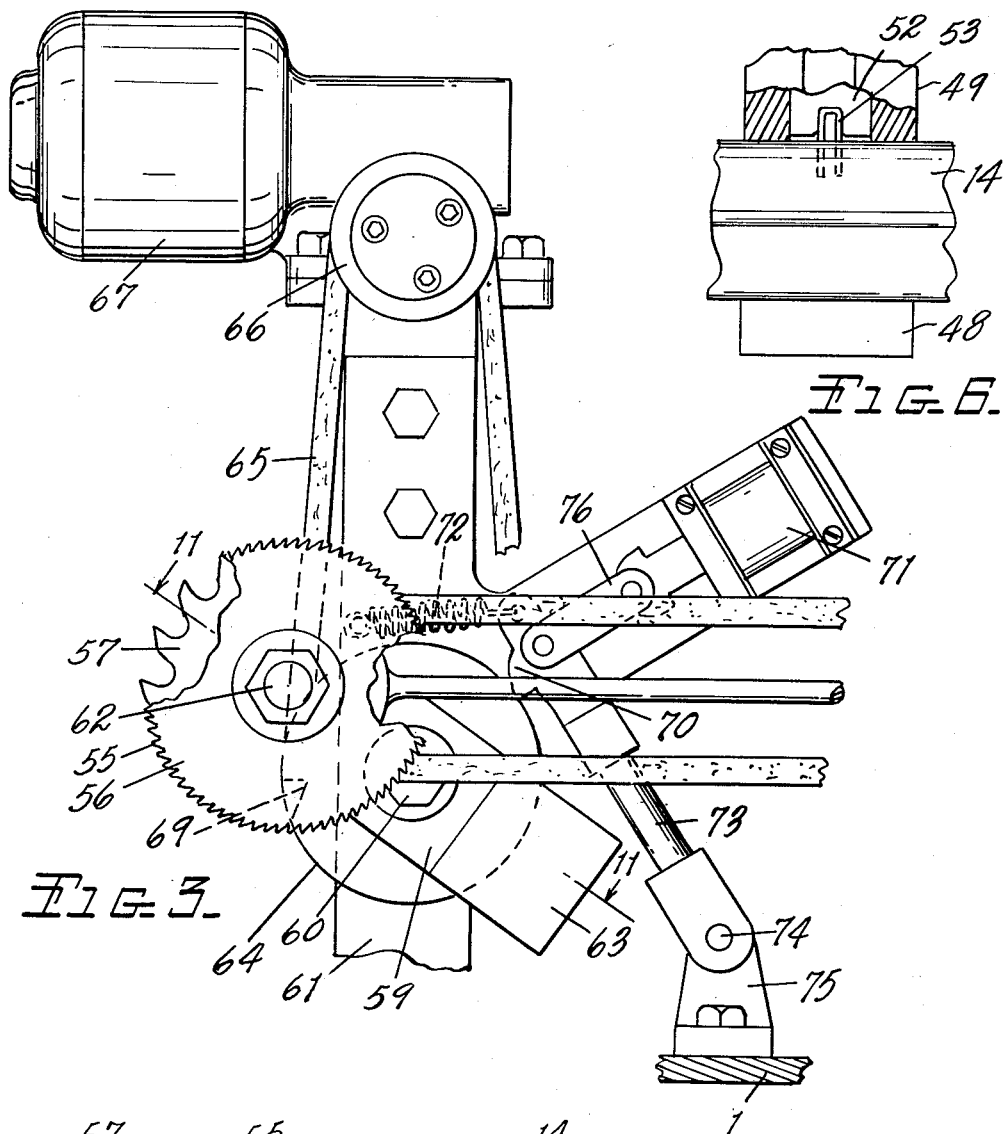
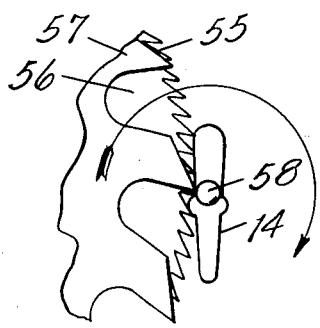
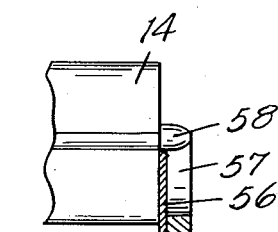
INVENTOR.
Glenn L. Sherwood
BY

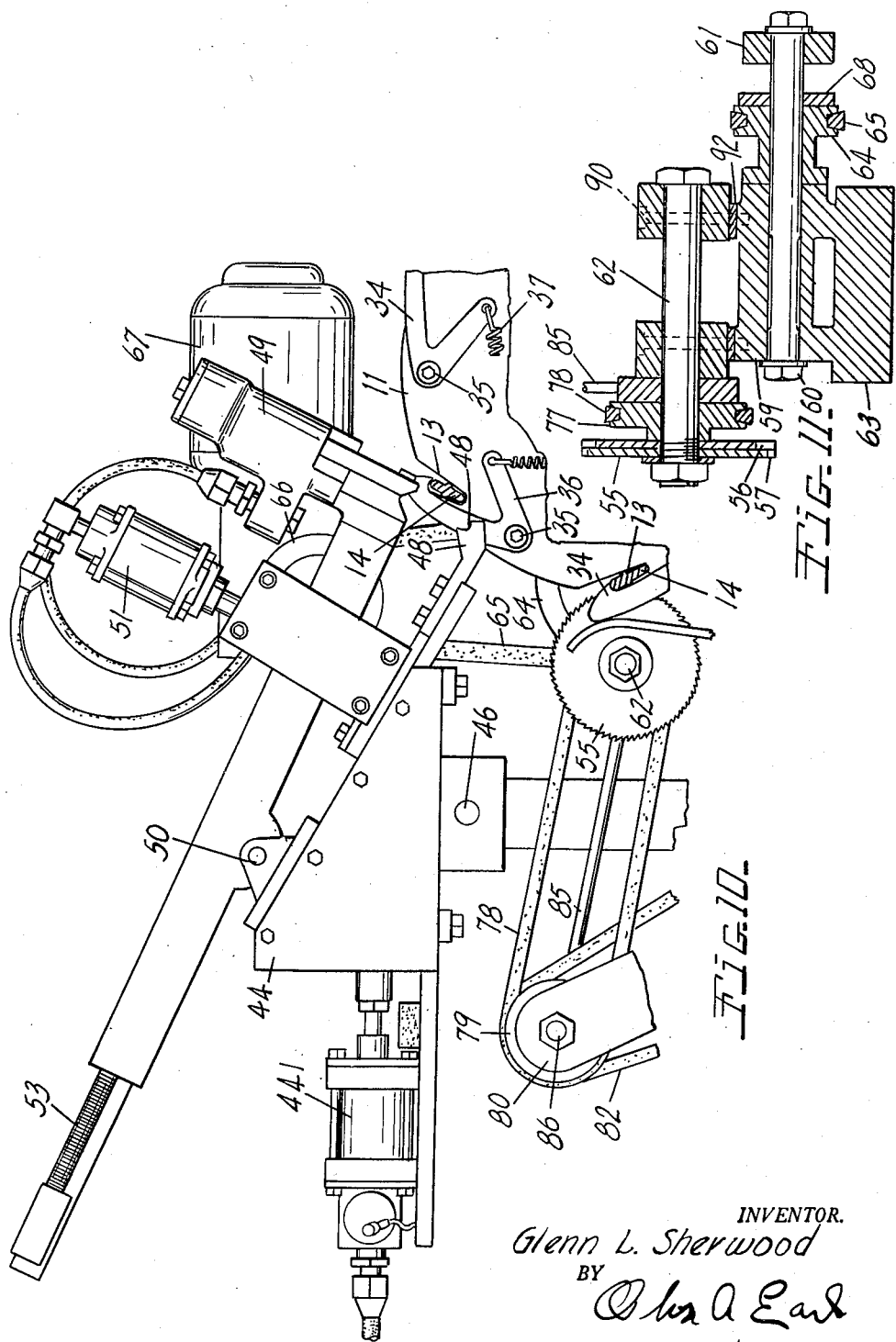

United States Patent Office 2,948,897
Patented Aug. 16, 1960

2,948,897
MACHINE FOR USE IN MANUFACTURING BLIND SLATS AND THE LIKE

Glenn L. Sherwood, Benton Harbor, Mich., assignor to Kaywood Corporation, Benton Harbor, Mich., a corporation of Michigan Filed Apr. 19, 1957, Ser. No. 653,992

20 Claims. (Cl. 1—125)

This invention relates to a machine for use in the manufacture of blind slats and the like which is mainly automatic in its operation. The main objects of this invention are, First, to provide a machine for the manufacture of blind slats and the like which is readily adjustable for the making of slats of varying lengths, is automatic in its operation, and is of large capacity.

Second, to provide a machine having these advantages which may be economically produced and at the same time is strong and durable.

Objects relating to details and economies of the invention will appear from the description to follow. The invention is defined and pointed out in the claims.

A preferred embodiment of the invention is illustrated in the accompanying drawing, in which:

Fig. 1 is a fragmentary plan view of a machine embodying my invention.

Fig. 2 is a fragmentary view partially in longitudinal section on a line corresponding to line 2—2 of Fig. 1.

Fig. 3 is an enlarged fragmentary view partially in section on a line corresponding to broken line 3—3 of Fig. 1.

Fig. 4 is an enlarged fragmentary view showing details of one of the cutters comprising a saw and a shaper, the travel of this cutter being indicated by the arrow.

Fig. 5 is an enlarged fragmentary view partially in section illustrating the relation of the cutter to a slat at the completion of the slat pivot or slat journal forming stroke.

Fig. 6 is an enlarged fragmentary view illustrating details of the stapler.

Fig. 7 is a fragmentary view of the means for driving the work holder, on a line corresponding to line 7—7 of Fig. 1.

Fig. 8 is a fragmentary view of a piece or section of slat stock.

Fig. 9 is a fragmentary view of a finished slat.

Fig. 10 is a fragmentary view similar to Fig. 2 but illustrating the staple attaching jaw in retracted open position.

Fig. 11 is fragmentary cross sectional view taken along the plane of the line 11—11 in Fig. 3.

The embodiment of my invention illustrated is designed for the manufacture of slats for blinds or the like, and particularly to forming the journals or pivots thereon and the driving of staples adapted to receive the actuating rod or bar in blind assemblies such, for example, as illustrated on my Patent No. 2,761,185, issued September 4, 1956.

In the embodiment illustrated the base 1 is provided with legs or standards 2 and has a work discharge opening 3 therein. The machine comprises two generally similar units 4 and 5, the unit 5 being supported for adjustment laterally relative to unit 4 to adapt the machine for the making of slats of different lengths. In this embodiment illustrated, the unit 5 comprises a base portion 6 slidably mounted on the bed 1 and adjustable thereon by means of the adjusting screw 7 rotatably supported on the bracket 8 and provided with suitable hand wheel and threaded into the tubular member 9 which is secured to the base member 6.

The work holder shaft 10 is common to both units. The work holder comprises a pair of disc-like holder members 11 and 12, the holder member 12 being splined to the shaft 10 for axial adjustment thereon with the adjustment of the adjustable unit. The work holder members are the same in structure, but the numerals 11 and 12 are used to designate the same for the reason that the member 11 is fixed to the shaft and the member 12 is axially adjustable thereon. These holder members are provided with slot-like tangentially disposed work holding or receiving recesses 13 adapted to receive the shaped work pieces 14, that is, the work pieces are cross-sectionally shaped before they are fed into the machine.

15 represents a hopper adapted to receive a plurality of the work pieces or stock, as shown in Fig. 8 in stacked relation. The feed chute 16 of the hopper is disposed so that the tangential work receiving recesses or holders thereof are successively aligned therewith as the work holder is operated step-by-step. The plungers 17 are reciprocated in timed relation with the step-by-step driving of the work holder so that the work is automatically fed to the work holder. The actuating means for the feed plungers 17 comprises the rocker arms 18 which are mounted on a rockshaft 19 and slotted at 20 to receive the connecting rod 21 with which the plungers 17 are engaged, see Figs. 1 and 2. The rockshaft 19 is provided with an arm 22 connected by the link 23 to the arm 24 pivoted at 25, see Figs. 1 and 2. The arm 24 is provided with a roller 26 coacting with the cam 27 on the driven shaft 28, see Figs. 1 and 2. This shaft is driven through a reduction gear designated generally by the numeral 29, see Fig. 2, and connected by the belt 30 to motor indicated at 31, see Fig. 2.

The shaft 10 of the work holder is driven step-by-step from the driving worm 32 on the shaft 28 which coacts with the gear 33 on the work holder shaft 10. This arrangement results in the step-by-step driving of the work holder and the feeding of the work when the work recesses 13 of the holder members are in aligned position with the work feed chute 16.

To releasably retain the work in the holder recesses, the work clamps 34 or jaws are pivoted at 35 and have inwardly projecting arms 36 connected by the springs 37 to the lugs 38 on the hubs of the holder members. These jaws have cammed faces 39 which are engaged by the work as it is advanced to the holder members so that the work passes under the jaws to be engaged by the retaining shoulders 40 thereof. These retaining shoulders are, however, inclined so that the work can be discharged therefrom by means which will be later described.

As the work is fed into the holder members, one end thereof engages the positioning guide 41 and when so engaged the work is sized lengthwise by means of saw 42 as the work is advanced by the plungers 17, see Fig. 1. The guide 41 projects forwardly beyond the corresponding guide 43. A motor 421 continuously drives the saw.

It will be understood that the machine is adapted for the production of slats of varying lengths as has been pointed out and that is the reason for making one member adjustable. In order to accommodate work of varying lengths, one side member of the feed hopper 15 is made adjustable to correspond with the adjustment of the adjustable unit. The detail of this adjustment is not illustrated.

As the work is advanced step-by-step, it is carried from the loading position to the stapler which comprises the reciprocating carriage or slide 44 mounted on the slideway 45, the slideway 45 being supported for lateral adjustment by means of the screw 46 threaded through the supporting post 47. The stapler carriage 44 is provided with a work supporting anvil 48 which is adapted, when in its forward position, to engage the forward edge of a slat, as is illustrated in Fig. 2. A pneumatic cylinder 441 reciprocates the slide 44.

The stapler head unit 49 is pivotally mounted at 50 and is reciprocated by the pneumatic unit 51. The stapler head hammer 52 is also pneumatically operated. The details of this stapler unit are not illustrated, as it forms no part of this invention other than that the stapler unit is mounted so that its anvil 48 may be reciprocated on the slideway 45 to and from work engaging position. In work engaging or actuated position the supporting anvil 48 is positioned to support the slat so that the staples 53 may be driven into it. The stapler head 52 is swung to and from operative position in timed relation to the reciprocation of the carriage. This stapler driving means is illustrated in staple driving position in Figs. 2 and 6, Fig. 6 illustrates the slat 14 in actuated position to the staple 53.

The holder members are axially spaced to permit this reciprocatory movement of the stapler unit to and from staple driving position. As the work is advanced the next step from the stapling position, the work clamping members 34 are engaged with the springable abutments 54, so that the work is firmly clamped or held in position while subjected to the pivot or journal forming cutters designated generally by the numeral 55.

These cutters 55 are duplicates except that they face in opposite directions. Each cutter comprises the saw 56 and the forming tool 57, the cutting edges of which are shaped to correspond to the desired length of the pivot or journal 58, see Figs. 3, 4, and 5. The saw and the forming tool are clamped in side-by-side relation upon the driven shaft or spindle 62. The cutter is mounted upon the support 59 which is pivotally mounted at 60 on the upright 61, the cutter being rotatably mounted by the shaft 62 on this support in radially spaced relation to its pivot 60. The support is provided with a counterbalance 63 for the cutter. The cutter support 59 is provided with a pulley 64 driven by the belt 65 from the driving pulley 66 which is in turn driven from the motor 67. This provides a friction drive for the support 59 which is provided with a stop disc 68 having a keeper notch 69 therein with which the dog 70 engages on each revolution of the cutter support. The stop dog 70 is disengaged by the solenoid 71, see Fig. 3, the wiring for the solenoid is not illustrated, but it will be understood that the solenoid is actuated in timed relation with the step-by-step advancement of the work holder. The cutter support 59 is rotated whenever the dog 70 is retracted to swing the cutter 55 around the pivot 58 being cut or formed thereby. When the dog is engaged with the stop disk 68 the belt 65 of the friction drive slips on the pulley 64.

When the work is in proper position to permit the cutter to operate thereon, this solenoid is actuated to release the stop disc 68 and the cutter is actuated through another cycle. The coil spring 72 urges the dog 70 to engaging position. In the embodiment illustrated, the dog is supported by the oscillating arm 73 which is pivoted at 74 on the fixed bracket 75, the solenoid being connected to the dog by the link 76.

The cutter is continuously driven, the cutter being provided with a pulley 77 driven by the belt 78 from the driving pulley 79 which is swingably mounted on the arm 80 pivoted at 81. The pulley 79 is driven by the belt 82 from the pulley 83, which is in turn driven from the motor 84. To keep proper tension on the belt 78, the link or connecting rod 85 is connected to the shaft 62 of the cutter and to the shaft 86 of the pulley 79. The connecting rod is desirably adjustable lengthwise to maintain proper driving tension it being threaded into the coupling member 87. A clamping nut 88 is provided to secure these parts in their adjusted position. With the parts thus arranged, the cutter is automatically actuated with the step-by-step advancement of the work. As the work is carried from the cutting position or journal forming position, it is brought into engagement with the relatively fixed work discharge members 89 and owing to the inclined face of the clamp is disengaged from the work holder and discharged through the opening 3 in the base.

To compensate for variation in the diameter of the cutter such, for example, as might result from the sharpening thereof or structural variations, the bearings for the saw shaft are adjustably connected to the holder member by means of the screws shown by dotted lines 90, see Fig. 1, and shims 92 indicated being provided to permit such adjustment and at the same time provide for a rigid connection.

It will be noted the clamps 34 have lateral projections on their ends, see Fig. 1, which engage the periphery of the holder member thereby limiting the inward swing of the clamps under the stress of the springs 37, see Fig. 2.

With this arrangement of parts the machine may be readily adapted for the production of slits of varying length and it is entirely automatic in its operation.

When the machine is in operation a supply of work pieces 14 are placed in the hopper 15 and they are automatically fed from the hopper by means of the plungers 17. The hopper is of such width as to properly align the work pieces so that they are fed into the machine with one end thereof abutting the guide member 41 and as they are advanced to the work holder they are sized as to length by the saw 42. The guide member 43 is disposed at the rear of the saw, see Fig. 1. The plungers 17 are reciprocated in timed relation with the step by step drive of the work holder so that the work is automatically fed to the work holder while it is at rest.

In the embodiment illustrated the stapling device is positioned to the rear of the charging position and the stapler is automatically retracted and actuated to drive the staples 53 while the work holder is at rest. The next step of the work holder positions the work to be acted upon by the pivot cutter and shaper and as the work holder is advanced step by step the work is brought into contact with the ejector member 89 which merely strips the work from the work holder and discharges it in the opening in the bed of the machine. These steps are repeated for each piece of work.

To adjust the machines for slats of different length the hopper is adjusted to the length of the stock and the adjustable work holder member adjusted to the desired length of slat. It will be understood that the several parts are operated in timed relation.

I have illustrated and described my invention in a highly practical embodiment thereof. I have not illustrated or described certain adaptations which I contemplate or which might be desirable for different or modified forms of work, as it is believed that this disclosure will enable those skilled in the art to embody or adapt the invention as may be desired.

Having thus described the invention, what is claimed as new and is desired to be secured by Letters Patent is:

1. A machine of the class described comprising a base, complementary units disposed in side by side relation on said base, a work holder shaft common to both units, one unit being mounted for lateral adjustment relative to the other, a work holder comprising a work holder member on each unit having driving engagement with said shaft, one work holder being splined to said shaft for adjustment axially thereof, said work holder members having aligned angularly spaced tangentially disposed work holder recesses opening to the peripheries thereof and facing rearwardly relative to the direction of rotation of the work holder, inwardly facing spring biased work clamps mounted on the inner sides of said work holder members to engage work seated in said recesses, means for driving said work holder step by step, a pivot cutter comprising saw and shaper elements, a rotatable friction driven cutter support on which said cutter is mounted in radially spaced relation to its axis, said support being provided with a counterbalance for said cutter and with a stop member provided with a keeper, a stop dog operatively associated with said cutter support keeper and coacting therewith to stop said cutter support on each revolution thereof, and driving means for said cutter.

2. A machine of the class described comprising a base, complementary units disposed in side by side relation on said base, a work holder shaft common to both units, one unit being mounted for lateral adjustment relative to the other, a work holder comprising a work holder member on each unit having driving engagement with said shaft, one work holder being splined to said shaft for adjustment axially thereof, said work holder members having aligned angularly spaced tangentially disposed work holder recesses opening to the peripheries thereof and facing rearwardly relative to the direction of rotation of the work holder, inwardly facing spring biased work clamps mounted on the inner sides of said work holder members to engage work seated in said recesses, means for driving said work holder step by step, a pivot cutter comprising saw and shaper elements, a rotatable friction driven cutter support on which said cutter is mounted in radially spaced relation to its axis, said support being provided with a counterbalance for said cutter and with a stop member provided with a keeper, a stop dog operatively associated with said cutter support keeper and coacting therewith to stop said cutter support on each revolution thereof, driving means for said cutter, and a supporting abutment for the work holding jaw engaging the work while it is operated upon by said cutter.

3. A machine of the class described comprising a base, complementary units disposed in side by side relation on said base, a work holder shaft common to both units, one unit being mounted for lateral adjustment relative to the other, a work holder comprising a work holder member on each unit having driving engagement with said shaft, one work holder being splined to said shaft for adjustment axially thereof, said work holder members having aligned angularly spaced tangentially disposed work holder recesses opening to the peripheries thereof and facing rearwardly relative to the direction of rotation of the work holder, inwardly facing spring biased work clamps mounted on the inner sides of said work holder members to engage work seated in said recesses, means for driving said work holder step by step, means for feeding work thereto, work guides disposed at the outer sides of said work holders, one guide projecting forwardly beyond the other guide and between which the work is translated by said work holder, a work length sizing cutter disposed to size the work while it is in positioning engagement with said longer guide member, a pivot cutter comprising saw and shaper elements, a rotatable friction driven cutter support on which said cutter is mounted in radially spaced relation to its axis, said support being provided with a counterbalance for said cutter and with a stop member provided with a keeper, a stop dog operatively associated with said cutter support keeper and coacting therewith to stop said cutter support on each revolution thereof, and driving means for said cutter.

4. A machine of the class described comprising a base, complementary units disposed in side by side relation on said base, a work holder shaft common to both units, one unit being mounted for lateral adjustment relative to the other, a work holder comprising a work holder member on each unit having driving engagement with said shaft, one work holder member being splined to said shaft for adjustment axially thereof, said work holder members having aligned angularly spaced tangentially disposed work holder recesses opening to the peripheries thereof and facing rearwardly relative to the direction of rotation of the work holder, inwardly facing spring biased work clamps mounted on the inner sides of said work holder members to engage work seated in said recesses, means for driving said work holder step by step, means for feeding work thereto, work guides disposed at the outer sides of said work holders, one guide projecting forwardly beyond the other guide and between which the work is translated by said work holder, a work length sizing cutter disposed to size the work while it is in positioning engagement with said longer guide member, a pivot cutter comprising saw and shaper elements, a rotatably driven cutter support on which said support is in radially spaced relation to its axis, means for driving said cutter, and a supporting abutment for the work holding jaw engaging the work while it is operated upon by said cutter.

5. A machine of the class described comprising complementary units disposed in side by side relation, one unit being laterally adjustable, a work holder shaft common to both units, a work holder comprising a work holder member on each unit having driving engagement with said shaft, said work holder members having aligned angularly spaced work supports, means for driving said work holder step by step, means for feeding work to said work supports, a length sizing means for the work fed to said holder, a reciprocable staple driving means including a work supporting anvil actuated in timed relation to said work holder to drive staples into the work between said work supports and while it is supported by said holder, a pivot cutter, a rotatably mounted support for said cutter, said cutter being mounted on said support in radially spaced relation to its axis, stop means acting to stop said cutter support on each revolution thereof, and means for rotatably driving said cutter support and driving said cutter in timed relation to the driving of said cutter support.

6. A machine of the class described comprising complementary units disposed in side by side relation, one unit being laterally adjustable, a work holder shaft common to both units, a work holder comprising a work holder member on each unit having driving engagement with said shaft, said work holder members having aligned angularly spaced work supports, means for driving said work holder step by step, a reciprocable staple driving means including a work supporting anvil actuated in timed relation to said work holder to drive staples into the work between said work supports and while it is supported by said holder, a pivot cutter, a rotatably mounted support for said cutter, said cutter being mounted on said support in radially spaced relation to its axis, stop means acting to stop said cutter support on each revolution thereof, and means for rotatably driving said cutter support and driving said cutter in timed relation to the driving of said cutter support.

7. A machine of the class described comprising complementary units disposed in side by side relation, one unit being laterally adjustable, a work holder shaft common to both units, a work holder comprising a work holder member on each unit having driving engagement with said shaft, said work holder members having aligned angularly spaced work supports, means for driving said work holder step by step, means for feeding work to said work supports, a reciprocable staple driving means including a work supporting anvil actuated in timed relation to said work holder to drive staples into the work between said work supports and while it is supported by said holder, a pivot cutter, a rotatably mounted support for said cutter, said cutter being mounted on said support in radially spaced relation to its axis, and means for rotatably driving said cutter support and driving said cutter in timed relation to the driving of said cutter support.

8. A machine of the class described comprising complementary units disposed in side by side relation, one unit being laterally adjustable, a work holder shaft common to both units, a work holder comprising a work holder member on each unit having driving engagement with said shaft, said work holder members having aligned angularly spaced work supports, means for driving said work holder step by step, means for feeding work to said work supports, a pivot cutter, a rotatably mounted support for said cutter, said cutter being mounted on said support in radially spaced relation to its axis, and means for rotatably driving said cutter support and driving said cutter in timed relation to the driving of said cutter support.

9. A machine of the class described comprising complementary units disposed in side by side relation, one unit being laterally adjustable, a work holder shaft common to both units, a work holder comprising a work holder member on each unit having driving engagement with said shaft, said work holder members having aligned angularly spaced work supports, spring biased work clamps mounted on said work holder members to engage work seated in said work supports, means for driving said work holder step by step, a pivot cutter, a rotatably mounted support for said cutter, said cutter being mounted on said support in radially spaced relation to its axis, means for rotatably driving said cutter support and driving said cutter in timed relation to the driving of said cutter support, and an abutment for said work holding clamp engaging the work while it is operated upon by said cutter.

10. A machine of the class described comprising complementary units disposed in side by side relation, one unit being laterally adjustable, a work holder shaft common to both units, a work holder comprising a work holder member on each unit having driving engagement with said shaft, said work holder members having aligned angularly spaced work supports, means for driving said work holder step by step, a pivot cutter, a rotatably mounted support for said cutter, said cutter being mounted on said support in radially spaced relation to its axis, and means for rotatably driving said cutter support and driving said cutter in timed relation to the driving of said cutter support.

11. A machine of the class described comprising complementary units disposed in side by side relation, a work holder shaft common to both units, a work holder comprising a work holder member on each unit having driving engagement with said shaft, said work holder members having aligned angularly spaced work supports, means for driving said work holder step by step, a length sizing means for the work fed to said holder, a pivot cutter, a rotatably mounted support for said cutter, said cutter being mounted on said support in radially spaced relation to its axis, stop means acting to stop said cutter support on each revolution thereof, means for rotatably driving said cutter support and driving said cutter in timed relation to the driving of said cutter support.

12. A machine of the class described comprising complementary units disposed in side by side relation, a work holder shaft common to both units, a work holder comprising a work holder member on each unit having driving engagement with said shaft, said work holder members having aligned angularly spaced work supports, means for driving said work holder step by step, a pivot cutter, a rotatably mounted support for said cuter, said cutter being mounted on said support in radially spaced relation to its axis, and means for rotatably driving said cutter support and driving said cutter, in timed relation to the driving of said cutter support.

13. A machine of the class described comprising complementary units disposed in side by side relation, a work holder shaft common to both units, a work holder comprising a work holder member on each unit having driving engagement with said shaft, said work holder members having aligned angularly spaced work supports, means for driving said work holder step by step, a length sizing means for the work fed to said holder, a reciprocable staple driving means including a work supporting anvil actuated in timed relation to said work holder to drive staples into the work while it is supported by said holder, a pivot cutter, a rotatably mounted support for said cutter, said cutter being mounted on said support in radially spaced relation to its axis, stop means acting to stop said cutter support on each revolution thereof, and means for rotatably driving said cutter support and driving said cutter in timed relation to the driving of said cutter support.

14. In a machine of the class described comprising a rotatably mounted work holder provided with an annular series of work supports, means for driving said work holder step by step, means for feeding work to said work supports, a length sizing means for the work fed to said holder adapted to act on the work after it is seated in said work supports, staple driving means actuated in timed relation to said holder to drive staples into the work while it is supported by said holder and while the holder is in a rest position, and pivot cutter means each comprising a driven cutter and a rotatable support for said cutter.

15. In a machine of the class described comprising a rotatably mounted work holder provided with an annular series of work supports, means for driving said work holder step by step, means for feeding work to said supports, length sizing means for the work fed to said holder adapted to act on the work after it is seated in said work supports, staple driving means actuated in timed relation to said holder driving means to drive staples into the work while it is supported by said holder and while the holder is in a rest position, and pivot cutters for the ends of the work actuated in timed relation to the work holder driving means and said staple driving means.

16. In a machine of the class described comprising a rotatably mounted work holder provided with an annular series of work supports, means for driving said work holder step by step, staple driving means actuated in timed relation to said holder to drive staples into the work while it is supported by said holder and while the holder is in a rest position, and pivot cutters, rotatably mounted supports for said cutters, said cutters being mounted on said supports in radially spaced relation to the axes thereof.

17. In a machine of the class described, a work holder comprising a pair of axially spaced disc-like work holder members having aligned slot-like work receiving recesses opening to the peripheries thereof, spring biased work clamps pivotally mounted on the sides of said work holder members and terminating in work engaging jaws engageable with the rear edges of work disposed in said recesses, said jaws overhanging the peripheries of said work holder members which constitute stops limiting the inward movement of said jaws under the action of their biasing spring, means for driving said work holder step by step, a staple driving means disposed to drive staples in the rearwardly facing edges of work translated by said work holder while the work holder is at rest and between said work holder members, and means for turning journals on the ends of the work while the holder is at rest and simultaneously with the operation of the staple driving means.

18. In a machine of the class described, a work holder comprising a pair of axially spaced disc-like work holder members having aligned tangentially disposed slot-like work receiving recesses opening to the peripheries thereof, spring biased work clamps pivotally mounted on the sides of said work holder members and terminating in work engaging jaws engageable with the rear edges of work disposed in said recesses, means for turning journals on the ends of the work while the holder is at rest and simultaneously with the operation of the staple driving means, and relatively fixed work ejecting means with which work is engaged by the rotation of the holder to eject the work from said slot-like work receiving recesses of said holders.

19. In a machine of the class described, a work holder comprising a pair of axially spaced disc-like work holder members having aligned tangentially disposed slot-like work receiving recesses opening to the peripheries thereof, spring biased work clamps pivotally mounted on the sides of said work holder members and terminating in work engaging jaws engageable with the rear edges of work disposed in said recesses, a staple driving means disposed to drive staples in the rearwardly facing edges of work translated by said work holder while the work holder is at rest and between said work holder members, and relatively fixed work ejecting means with which work is engaged by the rotation of the holder to eject the work from said slot-like work receiving recesses of said holders.

20. A machine of the class described comprising a base, complementary units disposed in side by side relation on said base, a work holder shaft common to both units, one unit being mounted for lateral adjustment relative to the other, a work holder comprising a work holder member on each unit having driving engagement with said shaft, one work holder member being splined to said shaft for adjustment axially thereof, said work holder members having aligned work supports, means for driving said work holder step by step, means for feeding work to said supports, a pivot cutter, a rotatably driven cutter support on which said cutter is mounted in radially spaced relation to its axis, a pulley on said cutter, an oscillating arm having a cutter driving pulley thereon, a connecting rod for said arm to said cutter support member, and a belt connecting said pulley on said cutter to said driving pulley on said arm.

References Cited in the file of this patent

UNITED STATES PATENTS

| | | |
|---|---|---|
| 80,392 | Clark | July 28, 1868 |
| 82,801 | Clark | Oct. 6, 1868 |
| 99,327 | Leclere | Feb. 1, 1870 |
| 332,699 | Bush | Dec. 22, 1885 |
| 1,369,726 | Borba | Feb. 22, 1921 |
| 1,484,150 | Parks | Feb. 19, 1924 |
| 2,047,021 | Friden | July 7, 1936 |